US005114224A

United States Patent [19]

Miyamoto et al.

[11] Patent Number: 5,114,224

[45] Date of Patent: May 19, 1992

[54] AUTOMATIC FOLLOW-UP PROJECTING SYSTEM

[75] Inventors: Takashi Miyamoto; Kazuya Miyagawa; Yukihito Tomimatsu; Tsutomu Sugiura; Kenji Nishi; Taku Ichihara, all of Tokyo, Japan

[73] Assignees: Densu Prox., Inc.; Aoi Studio Co., Ltd., both of Tokyo, Japan

[21] Appl. No.: 556,978

[22] Filed: Jul. 24, 1990

[30] Foreign Application Priority Data

Feb. 19, 1990 [JP] Japan .................................. 2-37943

[51] Int. Cl.[5] .............................................. G03B 21/00

[52] U.S. Cl. ...................................... 353/122; 353/28; 359/446

[58] Field of Search .................. 353/122, 28; 33/1 A; 356/4, 1; 250/561; 350/120

[56] References Cited

U.S. PATENT DOCUMENTS

| | | | |
|---|---|---|---|
| 1,099,207 | 6/1914 | Saudek | 353/28 |
| 2,796,802 | 6/1957 | Felice | 353/28 |
| 2,854,886 | 10/1958 | Stroud | 353/122 |
| 3,912,385 | 10/1975 | Stokes et al. | 353/122 |
| 4,406,428 | 9/1983 | Ferris | 353/28 |
| 4,515,450 | 5/1985 | Arrazola | 353/122 |
| 4,876,444 | 10/1989 | Field | 353/561 |

*Primary Examiner*—William A. Cuchlinski, Jr.

*Assistant Examiner*—William C. Dowling

*Attorney, Agent, or Firm*—Wenderoth, Lind & Ponack

[57] ABSTRACT

A light for an infrared ray) emitting member or a reflective (or an infrared ray reflective) medium is mounted at a predetermined position on an object upon which an image is projected. The light emitting member or the reflective medium is acquired in the coaxial direction of an image projecting unit by an (infrared ray) image pick-up means and video signals obtained by the (infrared ray) image pick-up means are digitized in an image processing unit, such that a highly luminous point of the light emitting or reflected portion occurs in a binary image. A central value of a primary moment on the binary image including the high luminous point, is calculated in real time, and the calculated data is fed back to an electrically-driven driving portion of the image projecting unit, so that the image may be continually projected at the predetermined position. The electrically-drive turntable automatically controls the image projecting direction including the direction of light. The image projecting apparatus projects the image by automatically tracking the position of the moving light emitting member or the reflective medium. Consequently, the image can be continually projected at the predetermined position, automatically tracking the moving object such as an airship or a balloon, so that it can be available as an effective advertizing medium or news.

9 Claims, 9 Drawing Sheets

AUTOMATIC FOLLOW-UP PROJECTING SYSTEM

BACKGROUND OF THE INVENTION

1. Field of the Invention

This invention relates to an automatic follow-up projecting system capable of tracking a moving object automatically to project a picture, an animation, characters and the like at a predetermined position thereon. The automatic follow-up projecting system according to this invention is able to automatically track the moving object and effect image projecting, so that this system can be widely used as a medium of advertising in which an image is projected on an airship or a balloon floating in the air from the roof of a structure such as a building.

2. Description of the Prior Art

In a conventional image projecting apparatus, an image is projected at a predetermined position of a fixed object such as a screen or the like by a slide projector, a cinema projector or the like which includes a luminous source. Because the object is fixed or cannot move, it is necessary for a viewer to come to the position or the vicinity thereof for the purpose of watching a projected image. Conventionally, image projecting is seldom performed with a moving screen or the like.

Recently, commercials or advertisements have been disseminated by projecting an image on a balloon or an airship. However, it is a difficult operation itself to project an image onto the object under such a condition that the projected object, for example a balloon, moves and changes directions frequently. In this situation, it has been a very important assignment to improve the operability of the projection apparatus. Consequently, there is a need for an apparatus which is not operated by manual control, and which effects an automatic tracking for projecting an image securely in response to the movement of a moving object.

SUMMARY OF THE INVENTION

This invention was made in consideration of the circumstances mentioned above and the object of this invention is to provide an automatic follow-up projecting system, particularly in the case where it is necessary to project an image on a moving object, which can be fully and automatically operated so as to reduce a great deal of the labor for operators, and which can ensure the projecting of an image by a smooth and steady automatic tracking in response to the movement of an object.

According to one aspect of this invention, for achieving the objects described above, an automatic follow-up projecting system is provided comprising: a turntable which can rotate arbitratily about horizontal and vertical axes in response to a moving object provided with a light emitting member, an image projecting apparatus having directivity which is mounted on the turntable so as to project an image at a predetermined position of the moving object, an image pick-up means having a field of view which includes the above-mentioned light emitting member, and a calculating controlling means connected to the image pick-up means and the turntable in order to drive and control the turntable by processing light quantity signals obtained from said light emitting member due to the image pick-up means and calculating the drive signals needed for tracking the moving object.

According to another aspect of this invention, there is provided an automatic follow-up projecting system comprising: a turntable which can rotate arbitrarily about horizontal and vertical axes in response to a moving object having a reflective member, an image projecting apparatus having directivity which is mounted on the turntable so as to project an image at a predetermined position of the moving object, an infrared ray irradiating means mounted on the turntable for radiating infrared rays onto the reflective member, the infrared rays being subsequently reflected from the reflective member, and a calculating controlling means connected to the infrared image pick-up means and the turntable in order to drive and control the turntable by processing the amount of the infrared rays and calculating the drive signals needed for tracking the moving object.

The nature, principle and utility of the invention will become more apparent from the following detailed description when read in conjunction with the accompanying drawings.

DESCRIPTION OF THE PREFERRED EMBODIMENTS

Embodiments according to this invention are described hereinafter based on the attached drawings.

Figure 1:
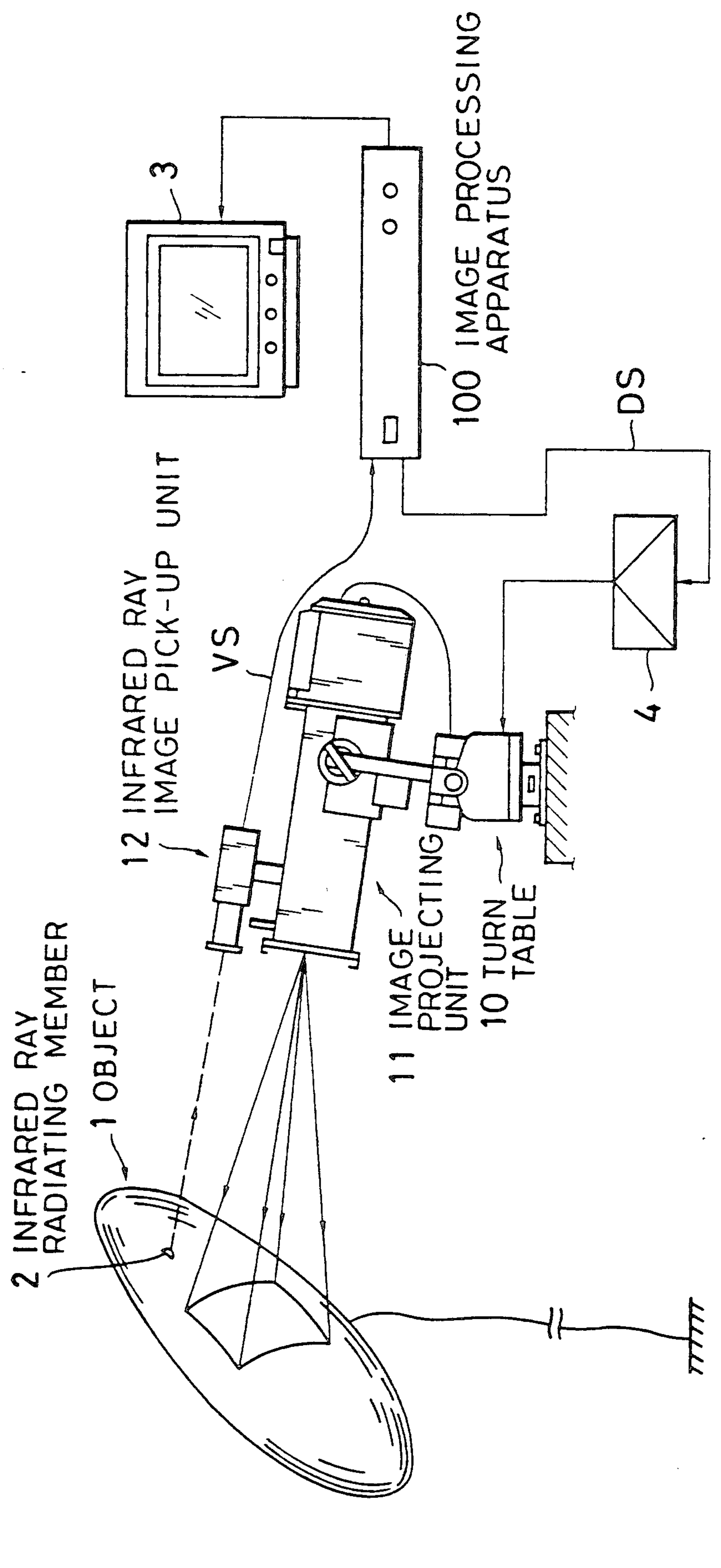
FIG. 1 shows a schematic configuration according to this invention.

FIG. 1 shows a schematic configuration according to this invention; an infrared ray radiating member 2 for tracking is attached at a predetermined position on an object 1 such as a balloon or the like. The infrared ray radiating member 2 may be whatever radiates infrared rays to an infrared ray image pick-up unit 12 positioned in the coaxial direction of an image projecting unit 11 (such as a slide or movie projector, or in addition, a laser beam projector, a video projector or the like). An image is projected on the object 1 by the directional image projecting unit 11 provided on an electrically-driven turntable 10; the infrared ray image pick-up unit 12, having a field of view which includes the infrared ray radiating member, is affixed to the image projecting unit 11. The image projecting unit 11 can project arbitrarily in horizontal and vertical directions with an exact directivity by driving the electrically-driven turntable 10. Video signals VS from the infrared ray image pick-up unit 12 are image-processed by an image processing apparatus 100 which is explained hereinafter, and the processed image frame is displayed on a monitor 3 such as a CRT or the like. Drive signals DS processed by the image processing apparatus 100 drive the turntable 10 via a driving section 4 of an amplifier or the like to control the projecting position of the image projecting unit 11, so as to track the shift of the object 1, the infrared ray radiating member 2, or a target point kept a fixed distance away from the object 1 and the infrared ray radiating member 2.

When the infrared ray radiating member 2 attached on the object 1 radiates infrared rays to the infrared ray image pick-up unit 12 positioned in the coaxial direction of the image projecting unit 11, the infrared ray image pick-up unit 12 attached to the image projecting unit 11 perceives a high luminous point as an image and the video signals VS are digitized in the image processing apparatus 100. A central value of a primary moment in a binary image is calculated on real time, for example, every 1/60 second, and signals corresponding to the amount of movement are transmitted on the basis of the positional data to the electrically-driven turntable 10 of the image projecting unit 11 via the driving section 4. The electrically-driven turntable 10 is controlled by the transmitted signals so that the projecting direction of the image projecting unit 11 may be automatically changed and automatic follow-up projecting may be carried out for the moving object 1, the infrared ray radiating member 2 or the target point kept a fixed distance away from the object 1 and the infrared ray radiating member 2.

Figure 2A:
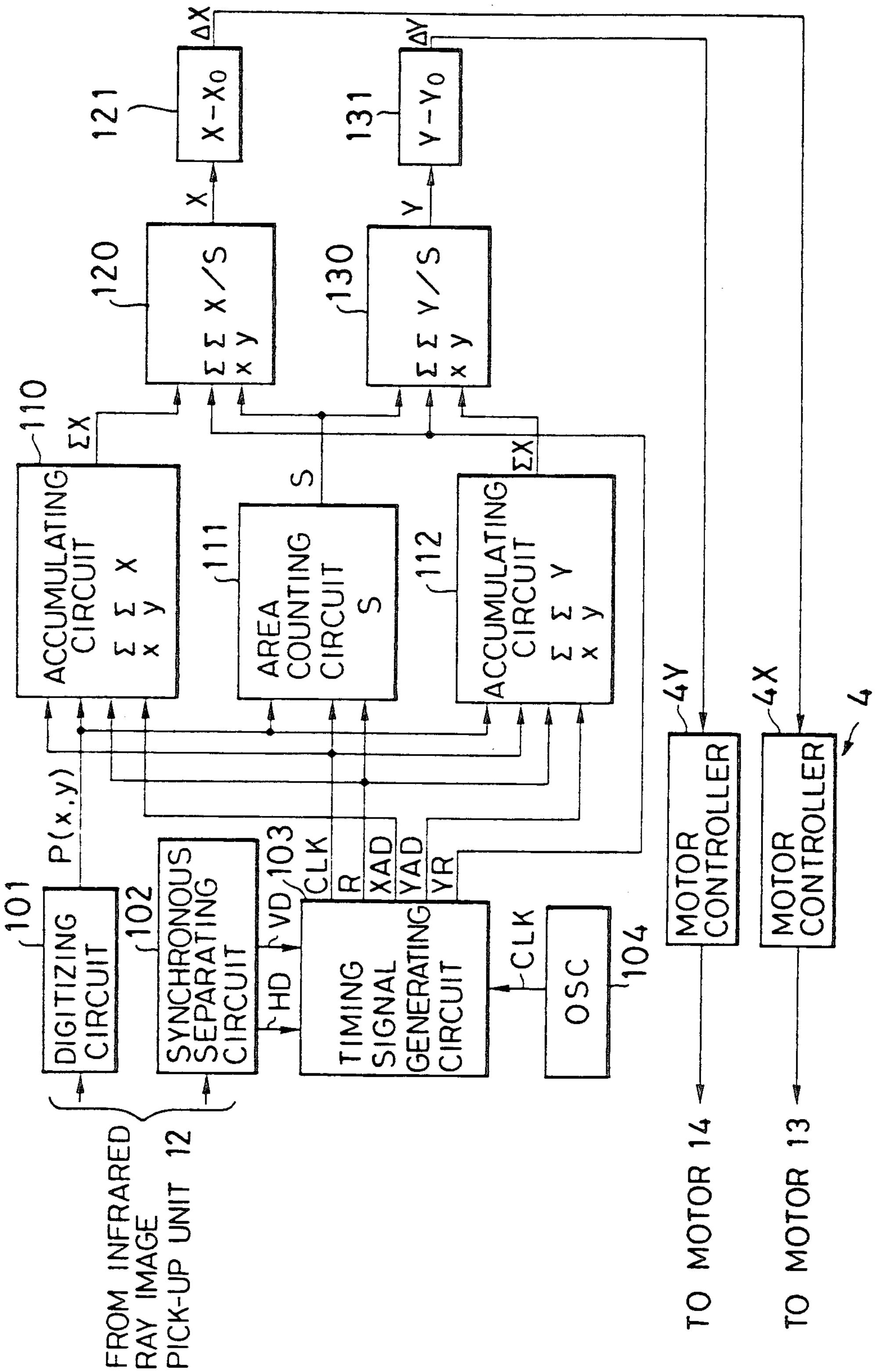
FIGS. 2A and 2B show a block diagram and a detailed illustration of a control system according to this invention.
Figure 2B:
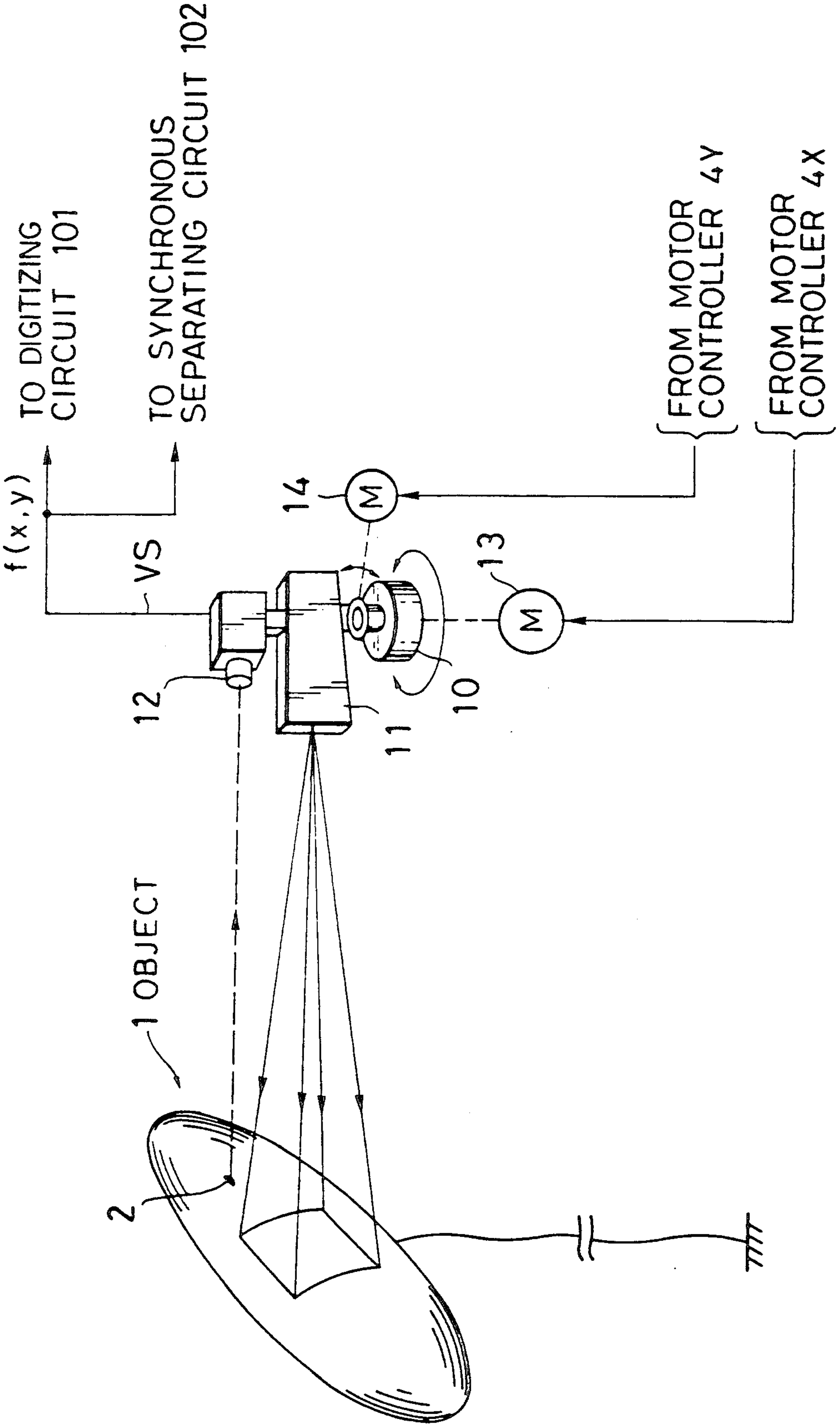
Figure 3:
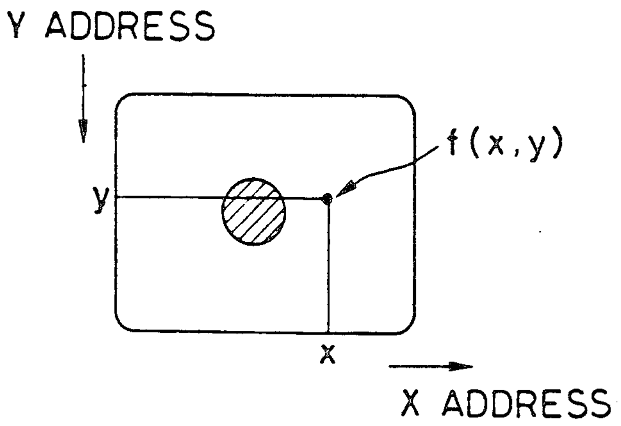
FIG. 3 shows the relationship between video signals and images.

In FIGS. 2A and 2B, the image processing apparatus 100 is mainly described in detail the image projecting unit 11 mounted on the electrically-driven turntable 10 is rotated in the horizontal direction by a motor 13, and in the vertical direction by a motor 14. An image may be projected in any arbitrarily direction by the combination of horizontal and vertical rotations. The infrared ray image pick-up unit 12 is provided with a lens system having a field of view covering a part of whole part of a directional region of the image projecting unit 11; the pick-up unit 12 outputs two dimensional address information f(x, y) as video signals VS. The video signals VS are inputted to a digitizing circuit 101, and converted into binary signals P(x, y) represented by "0" or "1" with a predetermined threshold level T. FIG. 3 shows the relationship between image information (oblique line part) and X-Y address, and illustrate that f(x, y) is a video signal VS at an address x and an address y. In the digitizing circuit 101, if $f(x, y) \geqq T$ (threshold level), then $P(x, y)=1$, and if $F(x, y)<T$, then $P(x, y)=0$.

Figure 4:
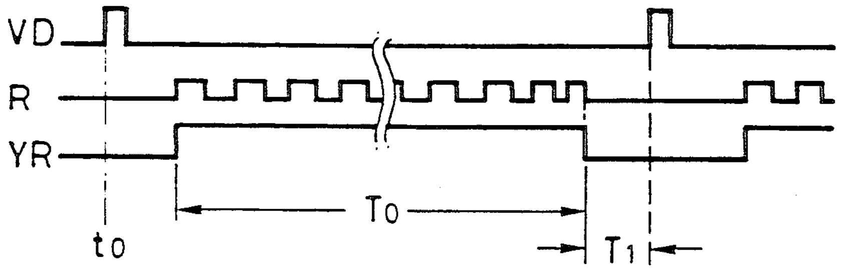
FIG. 4 shows a time chart illustrating an example associated with an input-output of a timing generating circuit.

The video signals VS are inputted to a synchronous separating circuit 102 in which they are divided into horizontal synchronous signals HD and vertical synchronous signals VD, and these divided signals HD and VD are inputted into a timing signal generating circuit 103. Clock signals CLK from a clock generating circuit 104 are inputted to the timing signal generating circuit 103; the frequency of the clock signals CLK is in accordance with the horizontal resolution of an image. The timing signal generating circuit 103 outputs the clock signals CLK which are inputted to accumulating circuits 110 and 112 and to an area counting circuit 111, and outputs signals R indicating a measuring region of the image information to the accumulating circuits 110 and 112 and the area counting circuit 111. Furthermore, the timing generating circuit 103 generates horizontal address signals XAD and input them to the accumulating circuit 110, and also generates vertical address signals YAD and inputs them to the accumulating circuit 112, and also generates signals YR indicating the completion of measuring and inputs them to calculating circuits 120 and 130. The timing for the vertical synchronous signals VD, the signals R indicating the measuring region, and the signals YR indicating the completion of measuring is shown in FIG. 4.

Figure 5:
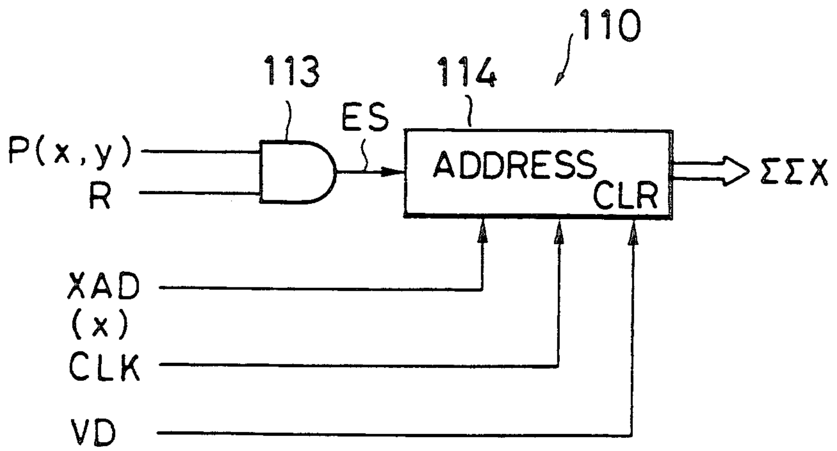
FIG. 5 shows a block diagram illustrating an example of an accumulating circuit.
Figure 6:
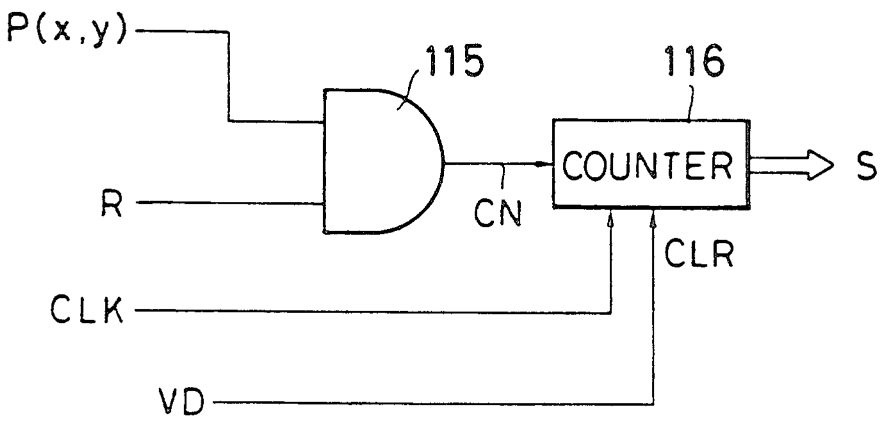
FIG. 6 shows a block diagram illustrating an area counting circuit.

The accumulating circuit 110 calculates $\Sigma\Sigma Y$; both accumulating circuits 110 and 112 have the same configuration. That is, the accumulating circuit 110 as shown in FIG. 5 comprises an AND circuit 113 and an adding circuit 114; the adding circuit 114 is activated to add the address signals XAD sequentially at the timing of the clock signals CLK only when both binary signal P(x, y) and signals R indicating the measuring region are "1" and an enable signal ES is "1". The adding circuit 114 is also cleared by inputting the vertical synchronous signal VD, and the added output $\Sigma\Sigma X$ represents $\Sigma\Sigma P(x, y)\times x$. Similarly, the output $\Sigma\Sigma Y$ of the accumulating circuit 112 represents $\Sigma\Sigma P(x, y)\times y$. The added values $\Sigma X$ and $\Sigma Y$ are inputted to the calculating circuits 120 and 130 respectively. The configuration of the area counting circuit 111 is as shown in FIG. 6; a counter 116 is cleared by the vertical synchronous signals VD, and counts the output CN from the AND circuit 115 with the clock signals CLK; the binary signals P(x, y) and the signals R indicating the measuring region are inputted to the AND circuit 115; the counter 116 outputs the signal S as a counted area value. The counted area S is inputted to the calculating circuits 120 and 130.

The calculating circuits 120 and 130 divide the accumulated result (a primary moment) for the X axis and the Y axis, respectively, by the area S (the moment of zero degrees) after the signals YR indicating the completion of the measuring are inputted. Then, the center position of the infrared ray radiating member 2 is calculated to output $X(=\Sigma\Sigma X/S)$ and $Y(=\Sigma\Sigma Y/S)$, thereby renewing the output values. FIG. 4 shows the circumstances, wherein the signals S, $\Sigma X$, $\Sigma Y$ are initialized by the input of the vertical synchronous signals VD (at the time points $t_0$ and $t_1$), and the signals S, $\Sigma X$, $\Sigma Y$ are measured during the time span $T_0$, and the measured values are renewed during the time span $T_1$.

Figure 7:
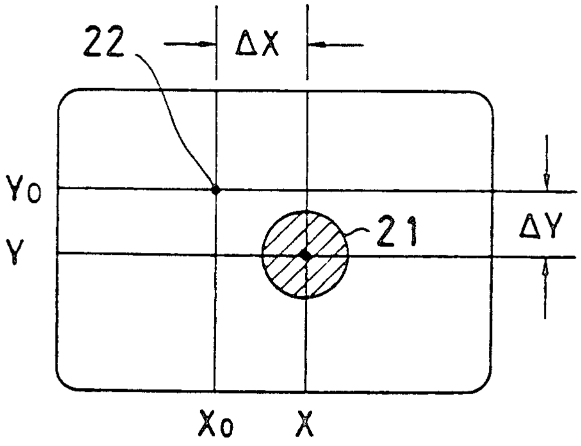
FIG. 7 shows the relationship between a center position of figure on an infrared ray radiating member and a target position.
Figure 8:
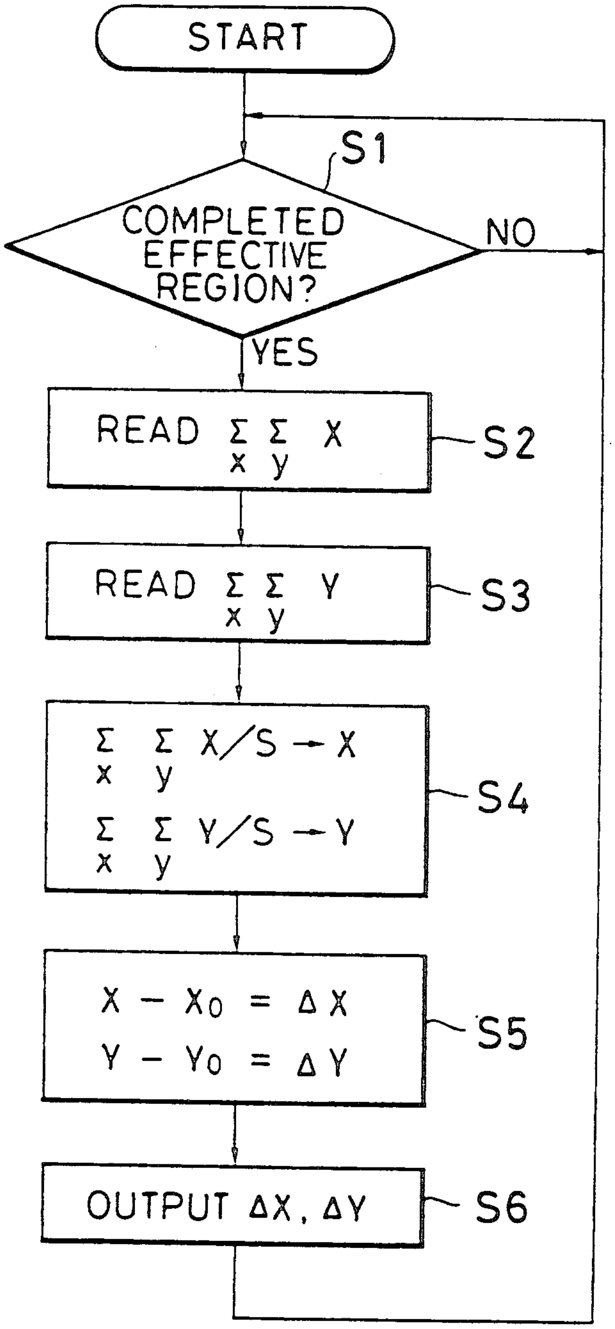
FIG. 8 shows a flowchart illustrating an example of calculations by software.

Calculating circuits 121 and 131 calculate the differences $\Delta X$ and $\Delta Y$ between the center position 21 of the infrared ray radiating member 2 and the target position 22 as shown in FIG. 7. Generally, the center position 21 of the infrared ray radiating member 2 corresponds to the target position 22; alternatively, the tracking operation may be carried out by keeping a fixed distance away from the infrared ray radiating member 2. The differences $\Delta X$ and $\Delta Y$ calculated by the calculating circuits 121 and 131 are inputted into motor controllers 4X and 4Y respectively, and the motor controllers 4X and 4Y drive motors 13 and 14 respectively. The differences after the operation described above are fed back so that a deviation between the target position 2 and the center of an image becomes zero. It is noted that the target position for projecting can be changed by adding a setting device capable of externally setting a position. The configuration as mentioned above is provided by hardware using the calculating circuits 120, 121, 130, and 131, although a configuration with software is also possible using a microcomputer in accordance with the flowchart shown in FIG. 8.

Figure 9:
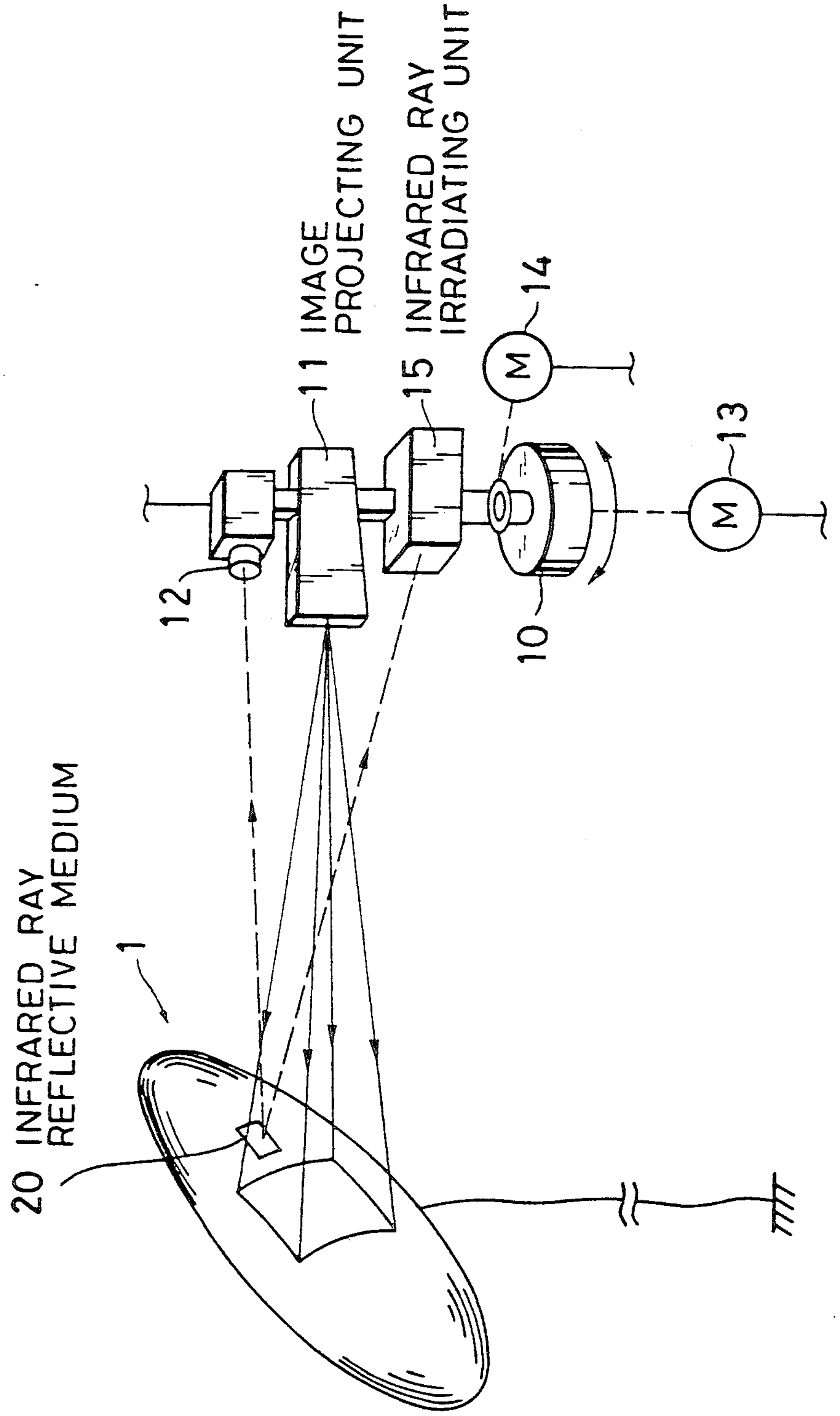
FIG. 9 to FIG. 11 show a schematic configuration of another embodiment according to this invention.

Although the embodiment described above represents the case in which an infrared ray radiating member 2 is set at a position beyond the image projecting region, an infrared ray radiating member can be set within the image projecting region and visible light can be applied to the light emitting member. When a visible light is applied to the light emitting member, a normal kind of an image pick-up means is available. Furthermore, another configuration as shown in FIG. 9 may be also available for the automatic follow-up projecting system wherein an infrared ray reflective medium 20 is mounted in place of the infrared ray radiating member 2 and an infrared ray irradiating unit 15 is provided on the electrically-driven turntable 10, so that an infrared ray image pick-up unit 12 can receive the reflected infrared rays from the infrared ray reflective medium 20. Visible light can be also applied to this embodiment. Moreover, the configurations of the blocks as shown in FIG. 5 and FIG. 6 are not limited by this embodiment. When the follow-up operation is carried out using infrared rays, the effect is appreciable, particularly at night, because the light for the automatic follow-up is invisible.

Figure 10:
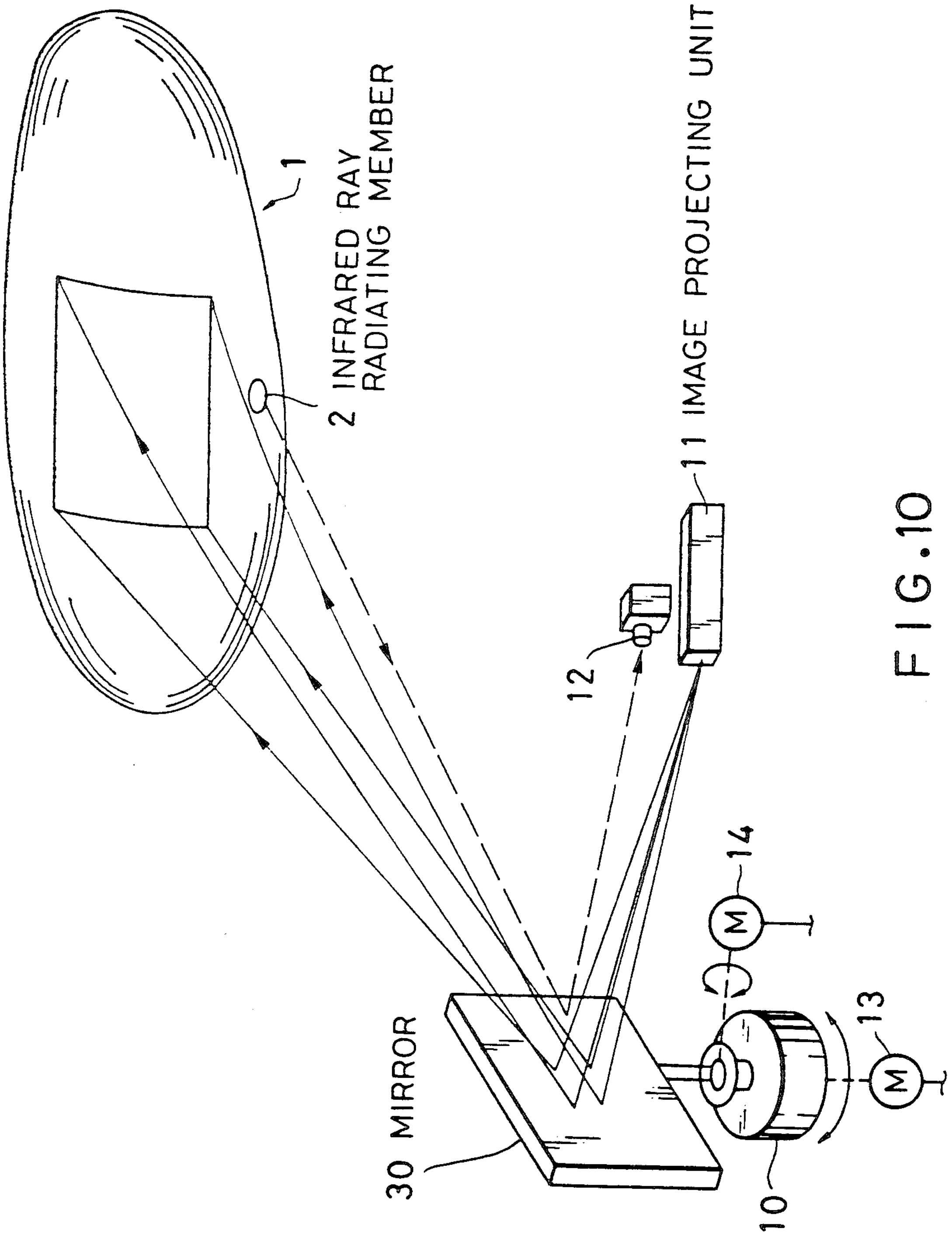
Figure 11:
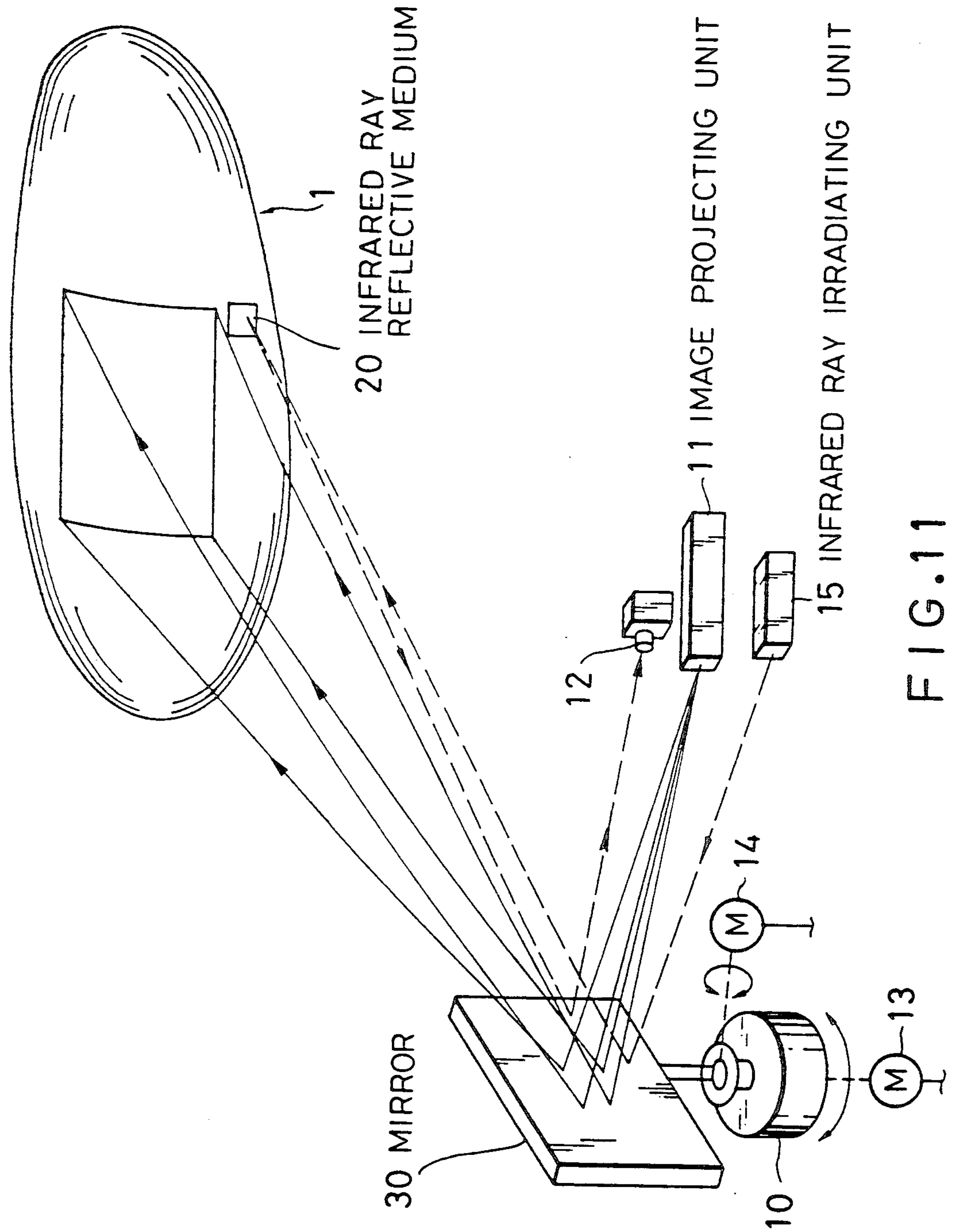

In the above-description, the image projecting unit 11, the infrared ray image pick-up unit 12 and an infrared ray irradiating unit 15 are attached to the electrically-driven turntable 10; therefore, it is difficult to control the system directly by the electrically-driven turntable 10 when these units are large in size or overweight. To deal with this, as shown in FIG. 10 or FIG. 11 a mirror 30 such as surface-evaporated mirror or the like is adapted to be attached to the electrically-driven turntable 10 while the image projecting unit 11, the infrared ray image pick-up unit 12 and the infrared ray irradiating unit 15 may be fixed at a separated place. In this case, an incident image is reflected by the mirror 30 to the infrared ray image pick-up unit 12, and the control of the turntable 10 is carried out in the same way as when a mirror is not used.

It is noted that this invention can be applied to a camera capable of automatically following up a subject by using a camera for film, video or the like in place of the image projecting unit 11.

As mentioned above, the use of the automatic follow-up projecting system according to this invention requires no operator, and allows a high speed, responsive smooth tracking. Because the system can steady track a moving object to project an image thereon, it is possible for an advertising image to be projected onto an airship or a balloon; alternatively, news may be announced with a character image and/or animation being projected, and many other variations of the applications can be expected according to this invention.

It should be understood that many modifications and adaptations of the invention will become apparent to those skilled in the art and it is intended to encompass such obvious modifications and changes in the scope of the claims appended hereto.

What is claimed is:

1. An automatic follow-up projecting system comprising; a turntable pivotable arbitrarily about vertical and horizontal axes in response to a movement of a moving object having a light emitting member; an image projecting unit affixed said turntable, and having directivity so as to project an image at a predetermined position on said moving object; an image pick-up means for light emitted from said light emitting member; a calculating controlling means connected to said image pick-up means and said turntable, for driving and controlling said turntable in accordance with light quantity signals obtained from said light emitting member by said image pick-up means, thereby moving said turntable so as to cause said image projecting unit to track said moving object.

2. An automatic follow-up projecting system according to claim 1, wherein said light emitting member is an infrared ray radiating member and said image pick-up means is an infrared ray image pick-up means.

3. An automatic follow-up projecting system according to claim 2, wherein said moving object is an airship or a balloon and said predetermined position is not overlapped by said infrared ray radiating member.

4. An automatic follow-up projecting system comprising; a turntable pivotable arbitrarily about vertical and horizontal axes in response to a movement of a moving object having a reflective member; an image projecting unit affixed to said turntable, and having directivity so as to project an image at a predetermined position on said moving object; an infrared ray radiating means affixed to said turntable for radiating infrared rays onto said reflective member; an infrared ray image pick-up means for receiving infrared rays reflected from said reflective member; a calculating controlling means connected to said infrared ray image pick-up means and said turntable, for driving and controlling said turntable in accordance with an amount of infrared rays obtained from said reflective member by said infrared ray image pick-up means, thereby moving said turntable so as to cause said image projecting unit to track said moving object.

5. An automatic follow-up projecting system according to claim 4, wherein said reflective member is a mirror or a tape mounted on the moving object.

6. An automatic follow-up projecting system according to claim 5, wherein said predetermined position is not overlapped by said mirror or tape.

7. An automatic follow-up projecting system comprising; a turntable pivotable arbitrarily about vertical and horizontal axes in response to a movement of a moving object having a light emitting member; a mirror attached to said turntable, an image projecting unit having directivity so as to project an image at a predetermined position on said moving object by way of said mirror; an image pick-up means for receiving light emitted from said light emitting member by way of said mirror; a calculating controlling means connected to said image pick-up means and said turntable, for driving and controlling said turntable in accordance with light quantity signals obtained from said light emitting member by said image pick-up means, thereby moving said turntable so as to cause said image projecting unit to track said moving object.

8. An automatic follow-up projecting system according to claim 7, wherein a reflective member is applied in place of said light emitting member and a light radiating means for radiating light to said reflective member by way of said mirror is applied.

9. An automatic follow-up projecting system according to claim 7, wherein said image projecting unit and image pick-up means are respectively fixed at a predetermined place and said mirror attached to said turntable is disposed away from said image projecting unit and image pick-up means.

* * * * *